US010229110B2

(12) United States Patent
He et al.

(10) Patent No.: US 10,229,110 B2
(45) Date of Patent: Mar. 12, 2019

(54) DISPLAYING AN APPLICATION IN THE GRAPHICAL USER INTERFACE OF A COMPUTER DISPLAY

(71) Applicant: INTERNATIONAL BUSINESS MACHINES CORPORATION, Armonk, NY (US)

(72) Inventors: Jenny J. He, Hampshire (GB); Adrian P. Kyte, Dorset (GB); Joseph R. Winchester, Hampshire (GB); Beichun Zhou, Beijing (CN); Jun T. Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 14/952,271

(22) Filed: Nov. 25, 2015

(65) Prior Publication Data

US 2016/0154789 A1     Jun. 2, 2016

(30) Foreign Application Priority Data

Nov. 27, 2014   (GB) .................................. 1421059.5

(51) Int. Cl.
   *G06F 17/22*   (2006.01)
   *G06F 17/27*   (2006.01)
(52) U.S. Cl.
   CPC ...... *G06F 17/2735* (2013.01); *G06F 17/2264* (2013.01)
(58) Field of Classification Search
   CPC ..... G06F 17/2264; G06F 17/24; G06F 9/4448
   See application file for complete search history.

(56) References Cited

U.S. PATENT DOCUMENTS 6,407,754 B1 *  6/2002  Hetherington ........ G06F 17/243
                                                        707/999.004
6,496,844 B1 * 12/2002  Hetherington .......... G06F 9/454
                                                            715/236

(Continued)

FOREIGN PATENT DOCUMENTS

EP        2682875 A1     1/2014

OTHER PUBLICATIONS

On the Softer Side Windows in the Military: "Creating a Multi-Lingual User Interface From a Commercial GUI Toolkit", COTS Journal, Jul. 2001, 3 pages.

*Primary Examiner* — Scott T Baderman
*Assistant Examiner* — Mario M Velez-Lopez
(74) *Attorney, Agent, or Firm* — Heslin Rothenberg Farley & Mesiti P.C.

(57) ABSTRACT

An embodiment of the present invention includes a method of displaying an application in the GUI of a computer display, where the application has been instructed to display text objects using a first language locale, and the GUI of the computer display is set to use a second language locale. The method includes a processor intercepting a command from the application to display a text object in the GUI, where the text object incorporates a text string corresponding to the first language locale and the processor retrieving, from the text object, a reference to a set of text strings associated with the text object, where each text string in the set of text strings has an associated language locale. The method also includes the processor sending a command to the GUI to display the object using a text string from the set of text strings associated with the second language locale.

18 Claims, 5 Drawing Sheets

(56) References Cited

U.S. PATENT DOCUMENTS

| | | | |
|---|---|---|---|
| 8,645,928 B2 | 2/2014 | Chu et al. | |
| 9,015,030 B2* | 4/2015 | Hunter | G06F 17/28 |
| | | | 704/3 |
| 2006/0100849 A1* | 5/2006 | Chan | G06F 17/241 |
| | | | 704/8 |
| 2006/0143605 A1* | 6/2006 | Cao | G06F 9/454 |
| | | | 717/174 |
| 2007/0180373 A1 | 8/2007 | Bauman et al. | |
| 2007/0244691 A1* | 10/2007 | Alwan | G06F 17/2276 |
| | | | 704/8 |
| 2007/0255788 A1* | 11/2007 | Troung | G06Q 10/10 |
| | | | 709/205 |
| 2008/0077384 A1* | 3/2008 | Agapi | G06F 9/454 |
| | | | 704/2 |
| 2011/0209047 A1* | 8/2011 | Olsen | G06F 17/2247 |
| | | | 715/234 |
| 2011/0213860 A1* | 9/2011 | Ezerzer | H04M 3/5191 |
| | | | 709/218 |
| 2012/0016655 A1* | 1/2012 | Travieso | G06F 17/2827 |
| | | | 704/2 |
| 2014/0096027 A1* | 4/2014 | Ji | G06F 9/454 |
| | | | 715/744 |
| 2014/0164902 A1* | 6/2014 | Sager | G06F 17/211 |
| | | | 715/234 |
| 2014/0249797 A1* | 9/2014 | Liu | G06F 17/2288 |
| | | | 704/2 |
| 2015/0039287 A1* | 2/2015 | Han | G06F 9/454 |
| | | | 704/2 |
| 2016/0328399 A1* | 11/2016 | Bolshinsky | G06F 17/30401 |

* cited by examiner

DISPLAYING AN APPLICATION IN THE GRAPHICAL USER INTERFACE OF A COMPUTER DISPLAY

PRIOR FOREIGN APPLICATION

This application claims priority from United Kingdom (GB) patent application number 1421059.5, filed Nov. 27, 2014, which is hereby incorporated herein by reference in its entirety.

BACKGROUND

It is common for applications that are displayed in GUIs to be "localizable," so that they can be instructed, when running, to display text for a particular locale (i.e., language, dialect or the like). During development such applications are provided with sets of text strings for each text object they contain and the text strings correspond to different locales and provide the actual text to display when the application is instructed to use that particular locale. So, for example, if the text object is a button which in English would have the text "Yes," in French the text could be "Oui" and in German, "Ja." The set of locales and text strings for the button would then be as seen in Table 1 below.

TABLE 1

| Locale | Text string |
|---|---|
| en | "Yes" |
| fr | "Oui" |
| de | "Ja" |

In order to allow this variation in texts, the source code for the application can take the form the follows:

```
Button b = new Button( );
b.setText("Yes");
``` in which the text is "hard coded", the source code is of the form:

```
Button b = new Button( );
b.setMessage(Messages.getMessage("guiclass.wizard.create.file",
"KEY_1");
``` where guiclass.wizard.create.file is a file available at runtime that contains the line:

KEY_1=Yes.

This example provides the default button text, but the system may also include a a file for each language bundle with a suffix and different values (e.g., guiclass.wizard.create.file.fr) for a locale (e.g., fr) which contains the line:

KEY_1=Oui.

This example provides the default button text, but the system may also include a a file for each language bundle with a suffix and different values, (e.g., guiclass.wizard.create.file.fr) for locale (e.g., fr) which contains the line:

KEY_1=Oui.

When the applications are compiled, these files are created to provide the text strings required for different locales, and are called locale resource bundles. A particular locale to use can be set at runtime of the application, for example, by means of a command-line switch. For example, applications written in the Java™ programming language can use a switch -locale(en) to instruct the application use English, -locale(fr) to use French, and so on. When the application is run, it dynamically switches all of the user visible strings, such as window titles, control labels, information and error messages, help text, and the like to the desired language, using the text strings in the locale resource bundle. In this way, the application does not need to be recompiled for use in different locales.

However, it can be the case that an application is being viewed by users who would prefer to use different languages. This might occur when a first user who prefers to use English is demonstrating the use of an application to a second user who prefers to use French, for example. In this case, the first user may be "driving" the application on their PC and sharing their display using social collaboration software with the second user who is in another country. In another example, the first user may be in a meeting in which they are "driving" the application on a main screen, but the second user (and any other users in the room) can log on with their own device to follow the demonstration.

SUMMARY

Shortcomings of the prior art are overcome and additional advantages are provided through the provision of a computer program product displaying an application in the GUI of a computer display, where the application has been instructed to display text objects using a first language locale, and where the GUI of the computer display is set to use a second language locale. The computer program product comprises a storage medium readable by a processing circuit and storing instructions for execution by the processing circuit for performing a method. The method includes, for instance, intercepting, by a processor, a command from the application to display a text object in the GUI, wherein the text object incorporates a text string corresponding to the first language locale; retrieving, by the processor, from the text object, a reference to a set of text strings associated with the text object, wherein each text string in the set of text strings has an associated language locale; and sending, by the processor, a command to the GUI to display the object using a text string from the set of text strings associated with the second language locale.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Aspects of certain embodiments of the present invention include methods and systems for displaying an application in the graphical user interface (GUI) of a computer display. In particular, some embodiments of the present invention include displaying an application that has been instructed to display text objects using a first language locale in a GUI set to use a second language locale. Certain embodiments of the present invention also include methods and systems for compiling source code for applications that are displayed using such methods and systems.

As aforementioned, it can be the case that an application is being viewed by users who would prefer to use different languages. This might occur when a first user who prefers to use English is demonstrating the use of an application to a second user who prefers to use French, for example. In this case, the first user may be "driving" the application on their PC and sharing their display using social collaboration software with the second user who is in another country. In another example, the first user may be in a meeting in which they are "driving" the application on a main screen, but the second user (and any other users in the room) can log on with their own device to follow the demonstration.

In such cases, it would be advantageous if each user could have the application displayed according to their own described locale. However, when an application is run only a single locale can be selected for the application to use.

US 2014/0096027 A1, published 3 Apr. 2014, hereby incorporated herein by reference in its entirety, discloses a system in which instances of an application are run simultaneously on different computer systems. The different instances of the application can be instructed to use different locales. One instance of the application is a "primary" instance, and actions performed on the primary instance are replicated to the other "secondary" instances, so that the operation of the application can be viewed by different users with the application using different locales. However, multiple instances of the application need to be run, which creates an undesirable overhead.

US 2008/0077384 A1, published 27 Mar. 2008, hereby incorporated herein by reference in its entirety, discloses a system in which when an application is displayed text is captured and translated dynamically, so that the application can be displayed using text for a locale that is not specifically supported by the application. However, it is a disadvantage that the translation may not be of a suitable quality, as the translations are not provided by the developer.

Aspects of certain embodiments of the present invention seek to solve and/or mitigate some or all of the above-mentioned disadvantages. Alternatively or additionally, certain embodiments of the present invention seek to provide improved methods and systems for displaying an application in the graphical user interface of a computer display, and to provide improved methods and systems for compiling source code for applications that are displayed using such methods and systems.

Figure 1:
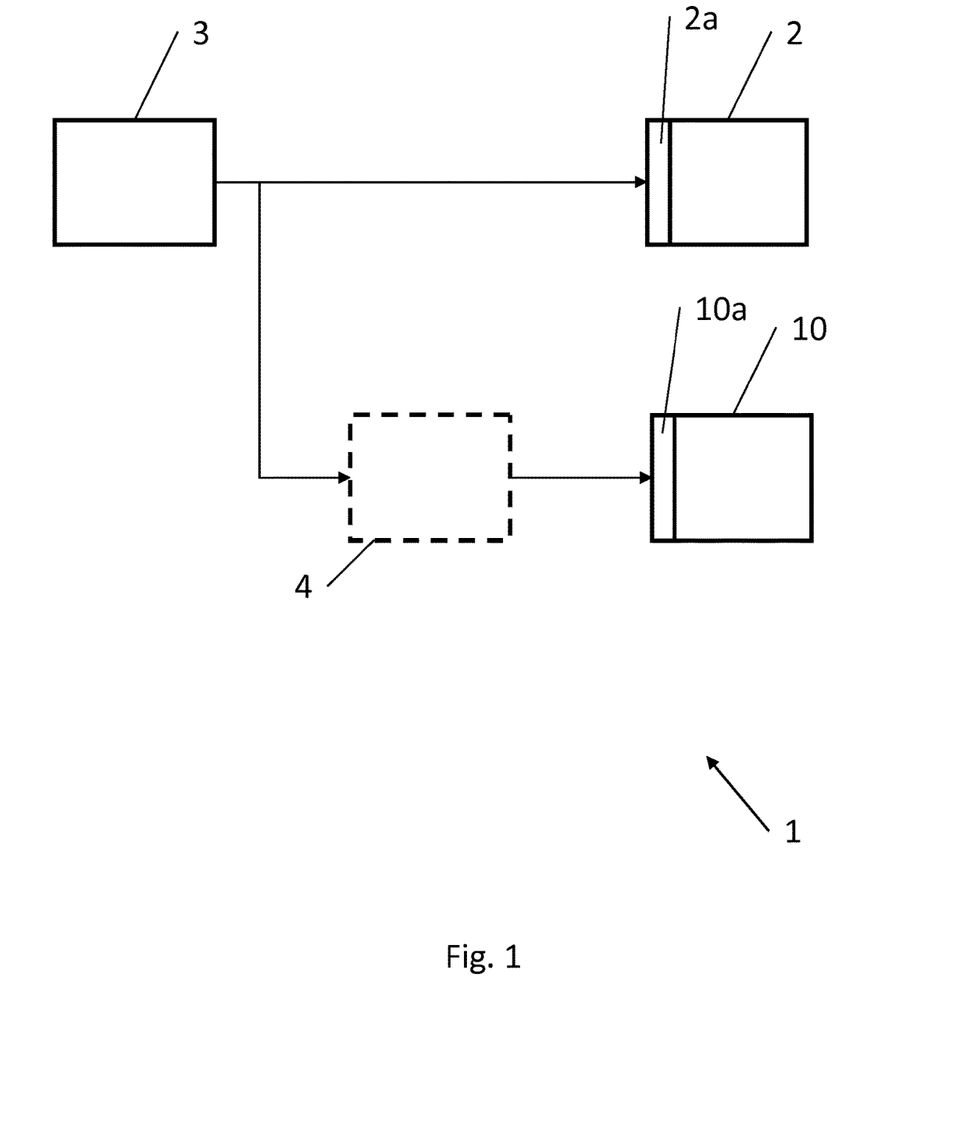
FIG. 1 shows a computer system utilizing certain aspects of an embodiment of the invention.

A computer system in accordance with an embodiment of the invention is shown in FIG. 1. The computer system 1 comprises an application 3, a GUI 2 and a GUI 10. The GUI 2 is the primary display through which the application 3 is controlled. The GUI 2 comprises a display thread 2a, and is set to use a first locale. The GUI 10 is a secondary display through which the application is viewed only, comprises a display thread 10a and is set to use a second locale different from the first locale. The computer system 1 further comprises a listener 4.

As illustrated in FIG. 1, the application 3 causes images to be displayed by the GUI 2 by sending commands directly to the windowing toolkit of the GUI 2, using its display thread 2a. Commands may include, but are not limited to, displaying a window, displaying a button for the user to click, or displaying a warning message. The windowing toolkit monitors the display thread 2a, and in response to a command in the display thread 2a takes the appropriate action, which may include but is not limited to, creating a window handle, and/or setting the attributes of a window handle to create the window class. The windowing toolkit is also responsible for turning keyboard or mouse interactions by a user into events, which are again sent to the display thread 2a. The application 3 monitors the display thread 3 and uses any events therein to execute its program logic. To render results back to the user, the application 3 posts these as new commands in the display thread, which results in GUI display changes.

However, in the computer system 1, the application 3 does not send commands directly to the display thread 10a of the GUI 10. Instead, the listener 4 intercepts the display commands before they reach the display thread 10a. The listener 4 then modifies the commands before passing them on to the display thread 10a, as described in detail below.

Figure 2:
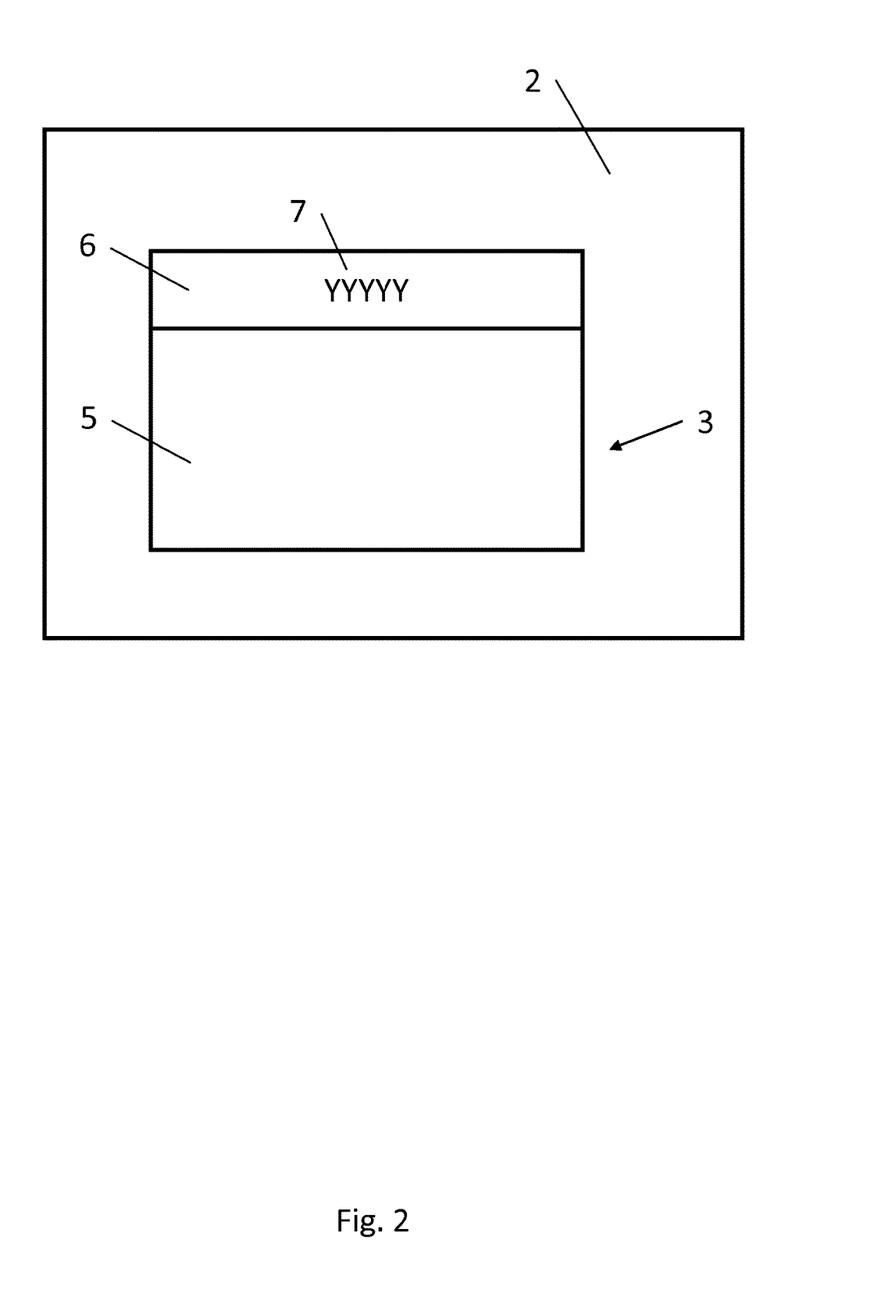
FIG. 2 shows a first GUI displayed utilizing certain aspects of an embodiment of the present invention.

The GUI 2, as displayed by the computer system 1, is shown in FIG. 2. As can be seen, the application 3 is displayed within the GUI 2, and is represented by a window 5. The window 5 has a title bar 6, with text 7 "XXXXX," which represents the text string for the title bar 6 for the locale of the GUI 2.

Figure 3:
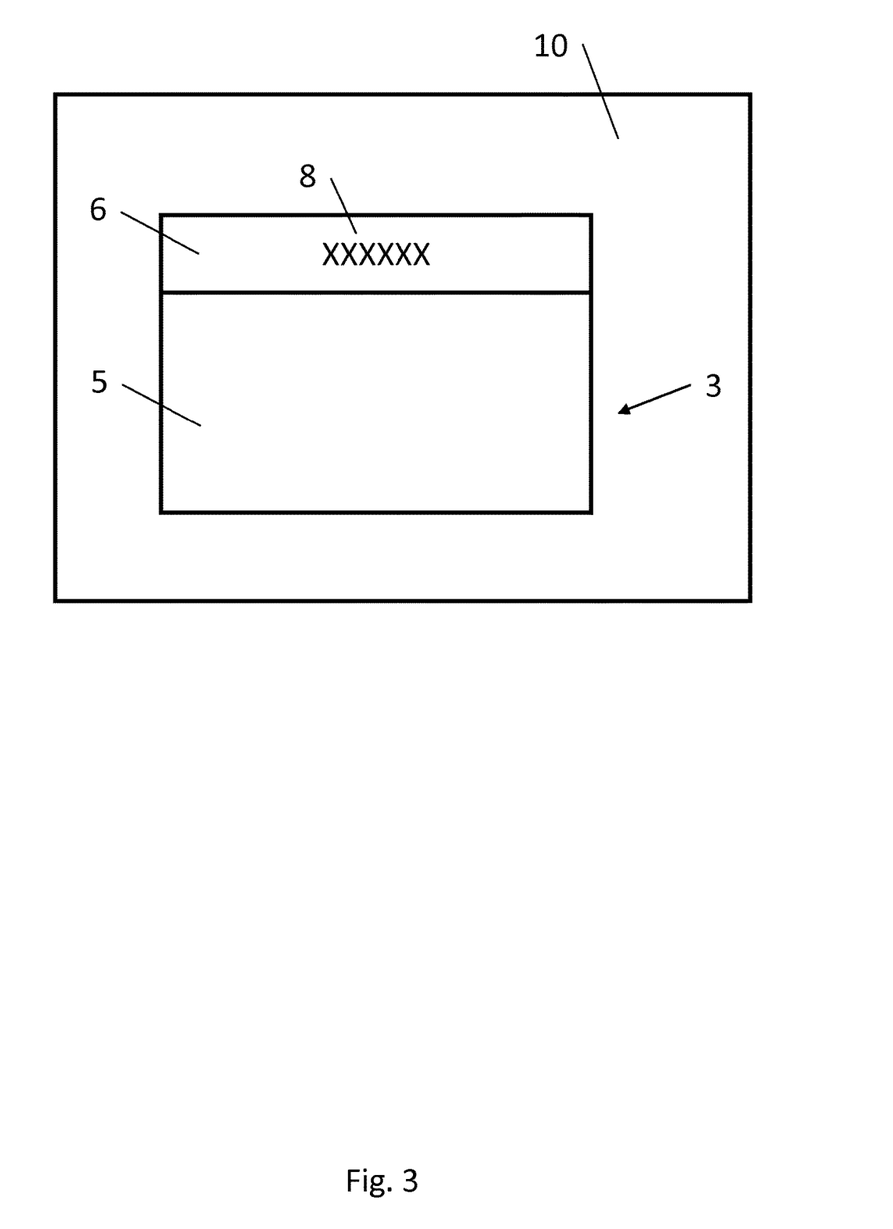
FIG. 3 shows a second GUI displayed utilizing certain aspects of an embodiment of the present invention.

The GUI 10, as displayed by the computer system 1, is shown in FIG. 3. Similarly, the application 3 is displayed within the GUI 10, and is represented by a window 5 with title bar 6. However, in this case, the title bar 6 has text 8 "YYYYY," which represents the text string for the title bar 6 for the different locale of the GUI 10.

Figure 4:
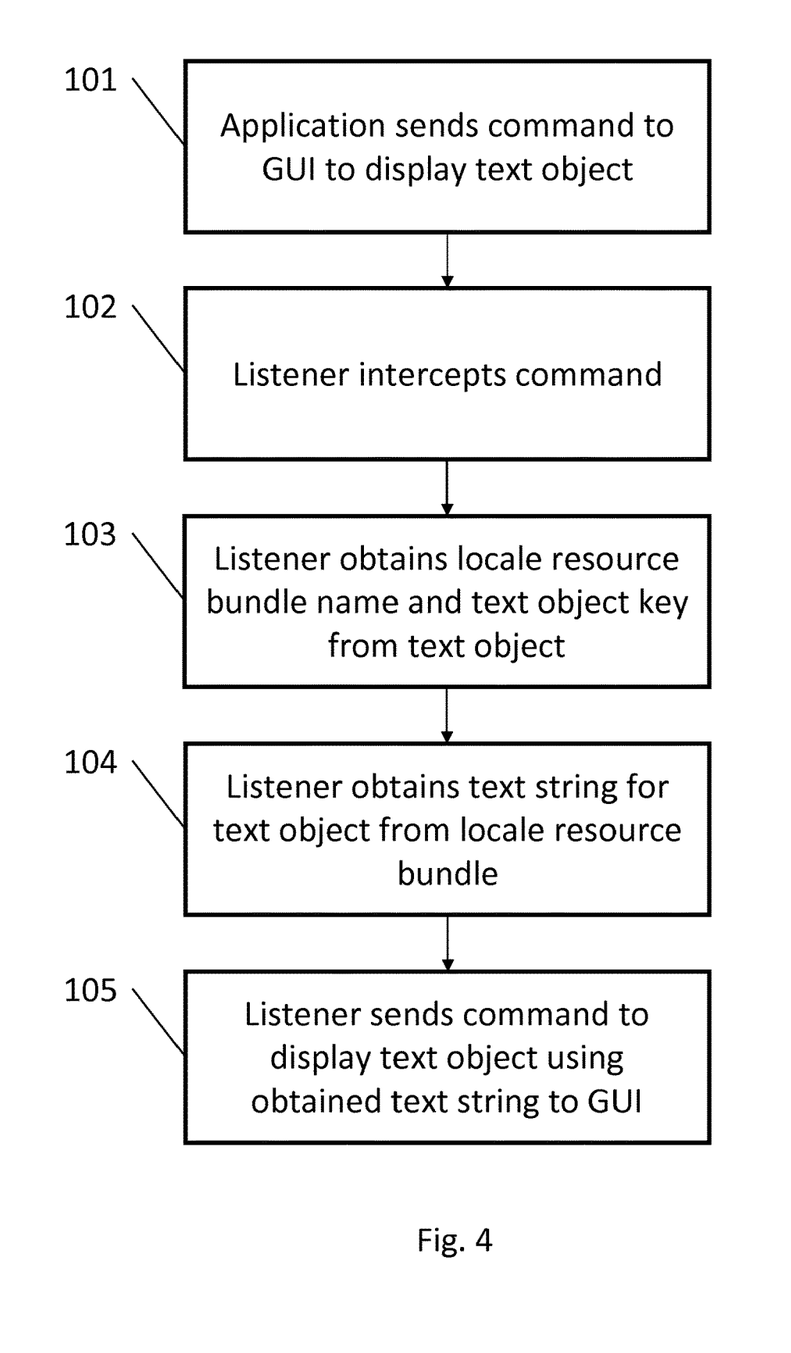
FIG. 4 is a flowchart showing certain aspects of the operation of an embodiment of the present invention when displaying an application.

The operation of the computer system 1, when displaying the application 3 on the GUI 2 and GUI 10, is now described with reference to the flowchart of FIG. 4. The listener 4 is initialized with settings that the GUI 2 is the primary display through which the application is controlled, and that the GUI 10 is a secondary display through which the application is viewed only. The listener 4 is also initialized with settings that the GUI 2 uses a first language, e.g., English, and the GUI 10 uses a second language, e.g., French. These settings may be obtained from the GUIs themselves, or set using switches when the listener 4 is initialized, for example. In an embodiment of the present invention, the listener 4 is initialized with the second language for the GUI 10.

In an embodiment of the present invention, the application 3 sends a command to display a text object, in this example a command to display the title bar 6 with text 7 "XXXXX" (101). The command is passed directly to the display thread 2a of the GUI 2, and results in the GUI 2 displaying the title bar 6 with text 7 "XXXXX."

In an embodiment of the present invention, before it reaches the display thread 10a of the GUI 10, the command is intercepted by the listener 4 (102). The listener identifies a command as being for a text object that uses a text string for display, as the specification of the windowing toolkit is finite and known. In an embodiment of the present invention, a text object command will be in a form including, but not limited to, WM_Button.setText( . . . ) or WM_Label.setText( . . . ).

The listener 4 obtains the locale resource bundle name and text object key, which are stored as attributes for the text object (103). (The way in which they are stored as attributes in an embodiment of the present invention is described later below.) The listener 4 then finds the set of text strings for the text object in the locale resource bundle using the text object key, and obtains from the set the text string for the locale set for the GUI 10 (104). The listener 4 modifies the command to use the obtained text string in place of the original text string used in the command, and passes the modified command to the display thread 10a. In one non-limiting example, the original text string is "XXXXX" as displayed by the GUI 2, and the newly obtained text string is "YYYYY." The listener 4 is able to replace the original text string with the newly obtained text string, as it knows the locale used by the GUI 2, i.e., the locale used by the application 3 itself, and can use this to determine the original text string "XXXXX" from the locale resource bundle in order to replace it with the newly obtained text string "YYYYY." In an embodiment of the present invention in which the listener 4 is initialized with the second language for the GUI 10, so it cannot determine the original text string "XXXXX" from the locale resource bundle, the listener 4 replaces the whole text string for the text object with the newly obtained text string "YYYYY."

As the modified command is passed to the display thread 10a, it results in the GUI 10 displaying the title bar 6 with text 8 "YYYYY," i.e., the same text object, but with text appropriate for the locale of the GUI 10.

An embodiment of the present invention utilizes multiple secondary GUIs, each with its own locale setting, by having the listener 4 (or multiple listeners) monitor the display threads of each secondary GUI.

As mentioned above, the listener 4 obtains the locale resource bundle name and text object key from attributes of the text object. Conventionally, the locale resource bundle being used for a particular GUI may not be known. In accordance with an embodiment of the present invention, the locale resource bundle name and text object key are inserted as attributes of the text object when the application 3 is compiled. The operation of the compiler that compiles the application 3 is now described with reference to the flowchart of FIG. 5.

Figure 5:
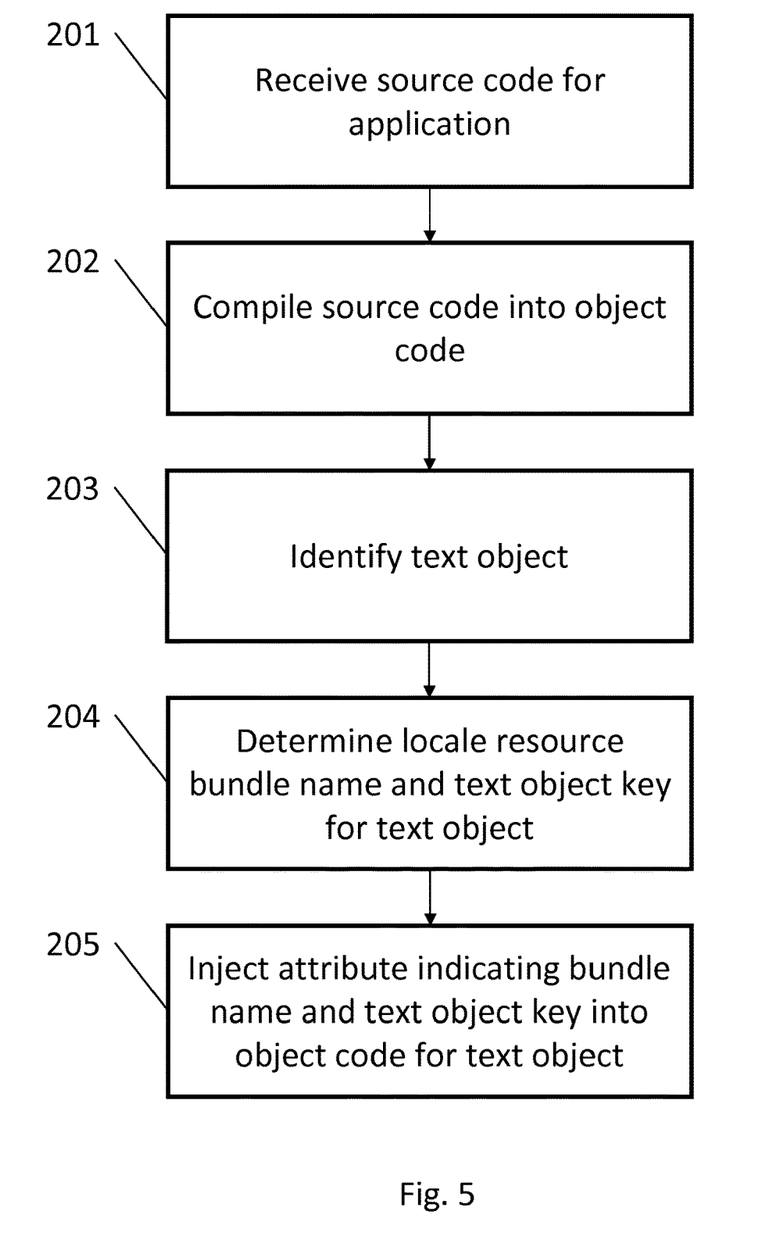
FIG. 5 is a flowchart showing certain aspects of the compilation of object code for an application displayed using the computer system in an embodiment of the present invention.

The compiler for the application receives the source code for the application (201). The compiler compiles the source code into object code in the usual way (202).

However, a text object may be identified in the source code (203). In this case, the locale resource bundle name and text object key for the text object are determined from the code, which sets the text object text (204), e.g., from a line of the form:

b.setMessage(Messages.getMessage("guiclass.wizard.create.file","KEY_1"); from which it can be determined that the locale resource bundle name is guiclass.wizard.create.file and the text object key is KEY_1.

The compiler injects additional object code into the object code for the application 3, as user attributes for the text object (205). The attributes are injected into the object code so that it is as if the attributes has been explicitly written in the source code, for example as if the source code were of the form:

---

Button b = new Button( );
b.setUserData("BUNDLENAME","guiclass.wizard.create.file");
b.setUserData("BUNDLE_KEY","KEY_1");
b.setMessage(Messages.getMessage("guiclass.wizard.create.file", "KEY_1")).

---

The attributes can then be used at runtime to determine the locale resource bundle name and text object key for a text object as described above.

User attributes are provided to allow arbitrary data to be added to an object, often for testing purposes or for screen readers where additional data is added to a GUI control to be read by other devices. Consequently, techniques for injecting user attributes at compile time without requiring the developer to explicitly add them are already known for use with aspect oriented programming, debugging tools and the like.

While the resulting object code may be large and might not be part of an optimized deliverable, this is well known where debuggable code modules are often large and more heavily instrumented than executables which might be obfuscated. In an embodiment of the present invention, the application 3 may be a version specifically provided for demonstration purposes using different locales simultaneously, with the production version of the application being optimized for use with one locale only at any one time.

As described herein, one aspect of certain embodiments of the present invention is a method of displaying an application in the GUI of a computer display, where the application has been instructed to display text objects using a first language locale, and where the GUI of the computer display is set to use a second language locale. In this embodiment of the present invention, the method includes: intercepting a command from an application to display a text object in the GUI, wherein the text object incorporates a text string corresponding to the first language locale; retrieving from the text object a reference to a set of text strings associated with the text object, wherein each text string in the set of text strings has an associated language locale; and sending a command to the GUI to display the object using the text string from the set of text strings associated with second language locale.

In accordance with aspects of certain embodiments of the present invention, the application can be displayed in the GUI with text appropriate for the locale of the GUI, even though that is not the locale that the application has been instructed to use. When the listener intercepts a display command, it uses information obtained from the command to determine the appropriate text for the second language locale of the GUI. It then uses this text to send a modified command to the GUI.

In an embodiment of the present invention, the method may also include retrieving from the text object an identification key for the text object.

In an embodiment of the present invention, the reference to a set of text strings may be obtained from a user attribute associated with the text object. In the case an identification key for the text object is obtained, it may alternatively or additionally be obtained from a user attribute associated with the text object.

In an embodiment of the present invention, the method also includes displaying the application in the GUI of a second computer display, wherein the GUI of the second computer display is set to use the first language locale. In one example, the second computer display is a primary display corresponding to a computer system using which the application is controlled, and the first computer display is a secondary display on which the application is displayed only. In this way, the application can be displayed simultaneously on first and second GUIs, for example when use of the application is being demonstrated, but with the different texts appropriate for different locales of the GUIs being used.

In an embodiment of the present invention, the set of text strings is used by the application to display text objects using the first language locale. In this case, preferably the reference comprises an identifier for a file comprising the set of text strings and an identifier for the text object. The set of text strings may be comprised in a locale resource bundle.

Another aspect of certain embodiments of the present invention, provides a method of compiling source code for an application, wherein the application is for display using any of the methods described above, the method, during complication of the source code application into object code. The method include, for example: identifying a text object in the source code; inserting code into the object code for the text object, the inserted code providing a reference to the set of text strings associated with the text object.

In an embodiment of the present invention, code that provides the reference to the set of text strings is inserted into the compiled object code for the application, so that it can be used in accordance with the methods described above when the application is being run using a first language locale but displayed on a GUI set with a second language locale.

In an embodiment of the present invention, the inserted code may further provide an identification key for the text object.

In accordance with a further aspect of certain embodiment of the invention, a computer system displays an application, the displaying includes: a processor or processors on which an application is executed, wherein the application has been instructed to display text objects using a first language locale; a computer display comprising a GUI for displaying the application, wherein the GUI is set to use a second language locale; memory having stored on it a plurality of sets of text strings, each set of text strings being associated with a text object, and wherein each text string in a set of text strings has an associated language locale; wherein the computer system is arranged to: intercept a command from the application to display a text object in the GUI, wherein the text object incorporates a text string corresponding to the first language locale; retrieve from the text object a reference to a set of text strings of the plurality of sets of text strings associated with the text object; and send a command to the GUI to display the object using the text string from the set of text strings associated with second language locale.

In an embodiment of the present invention, the computer system further includes: a second computer display comprising a GUI for displaying the application, wherein the GUI is set to use the first language locale; and wherein the computer system is arranged to display the application in the GUI of the second computer display. In this case, preferably the second computer display is a primary display corresponding to a computer system using which the application is controlled, and the first computer display is a secondary display on which the application is displayed only.

In an embodiment of the present invention, the set of text strings is used by the application to display text objects using the first language locale. In this case, preferably the reference comprises an identifier for the plurality of sets of text strings, and an identifier for the text object.

In accordance with another aspect of certain embodiments of the present invention, a computer system for compiles source code for an application, wherein the application is for display by any of the computer systems described above, wherein the computer system is arranged, during compilation of the source code application into object code, to: identify a text object in the source code; insert code into the object code for the text object, the inserted code providing a reference to the set of text strings associated with the text object.

In accordance with another aspect of certain embodiments of the present invention, a computer program product for displays an application in the GUI of a computer display, the computer program product comprising a computer-readable storage medium having computer-readable program code embodied therewith, the computer-readable program code configured to perform any of the methods described above.

In accordance with a further aspect of certain embodiments of the present invention, a computer program product for compiles source code for an application, the computer program product comprising a computer-readable storage medium having computer-readable program code embodied therewith, the computer-readable program code configured to perform the method described above.

In accordance with a further aspect of certain embodiments of the present invention, a computer program product for displays an application, the computer program product comprising a computer-readable storage medium having computer-readable program code embodied therewith, the computer-readable program code configured when executed on a computer system to provide any of the computer systems described above.

In accordance with a further aspect of certain embodiments of the present invention, a computer program product for compiles source code for an application, the computer program product comprising a computer-readable storage medium having computer-readable program code embodied therewith, the computer-readable program code configured when executed on a computer system to provide the computer system described above.

It will of course be appreciated that features described in relation to one aspect of the present invention may be incorporated into other aspects of the present invention. For example, the method of the invention may incorporate any of the features described with reference to the apparatus of the invention and vice versa.

Whilst the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or control code written in any combination of one or more programming languages, including an control oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of displaying an application in a GUI of a computer display comprising:
   determining, by a processor, a language locale setting of the GUI of the computer display, based on continuously monitoring, via a listener, one or more display threads of one or more secondary GUIs displayed on the computer display;
   intercepting, at runtime of an instance of an application, by the processor, a command from the instance of the application to display a text object in the GUI as part of the instance, wherein the text object incorporates a text string corresponding to the language locale in which the instance of the application has been instructed to display the text objects, wherein the intercepting comprises:
  determining, by the processor, based on the text string, a language locale in which the instance of the application has been instructed to display text objects; and
  determining, by the processor, if the language locale in which the instance of the application has been instructed to the display text objects is equivalent to the language locale of the setting of the GUI of the computer display;
based on determining that the language locale in which the instance of the application has been instructed to the display text objects is not equivalent to the language locale of the setting of the GUI of the computer display, retrieving, by the processor, from the text object, a reference to a set of text strings associated with the text object, wherein each text string in the set of text strings has an associated language locale, wherein the language locale in which the instance of the application has been instructed to the display text objects comprises a first language locale and language locale of the setting of the GUI of the computer display comprises a second language locale; and
sending, by the processor, a command to the GUI to display the object using a text string from the set of text strings associated with the second language locale as part of the instance.

2. A method as claimed in claim 1, further comprising:
simultaneously displaying, by the processor, the instance of the application in the GUI of a second computer display using a text string from the set of text strings associated with the first language locale, wherein the GUI of the second computer display is set to use the first language locale.

3. A method as claimed in claim 2, wherein the second computer display is a primary display in a computer system, on which the processor can control the application, and the first computer display is a secondary display, on which the application is displayed only.

4. The method of claim 1, wherein the set of text strings is used by the application to display text objects using the first language locale.

5. The method as claimed in claim 4, wherein the reference comprises an identifier for a file comprising the set of text strings and an identifier for the text object.

6. The method of claim 1, further comprising:
compiling, by the processor, source code for the application, the compiling comprising:
  identifying, by the processor, a text object in the source code;
  inserting, by the processor, code into object code for the text object, the inserted code providing a reference to the set of text strings associated with the text object.

7. A computer system for displaying an application in a GUI of a computer display comprising:
a memory;
one or more processor in communication with the memory; and
program instructions executable by the one or more processor via the memory to perform a method, the method comprising:
  determining, by a processor, a language locale setting of the GUI of the computer display, based on continuously monitoring, via a listener, one or more display threads of one or more secondary GUIs displayed on GUI of the computer display;
  intercepting, at runtime of an instance of an application, by the processor, a command from the instance of the application to display a text object in the GUI as part of the instance, wherein the text object incorporates a text string corresponding to the language locale in which the instance of the application has been instructed to display the text objects, wherein the intercepting comprises:
    determining, by the processor, based on the text string, a language locale in which the instance of the application has been instructed to display text objects; and
    determining, by the processor, if the language locale in which the instance of the application has been instructed to the display text objects is equivalent to the language locale of the setting of the GUI of the computer display;
  based on determining that the language locale in which the instance of the application has been instructed to the display text objects is not equivalent to the language locale of the setting of the GUI of the computer display, retrieving, by the processor, from the text object, a reference to a set of text strings associated with the text object, wherein each text string in the set of text strings has an associated language locale, wherein the language locale in which the instance of the application has been instructed to the display text objects comprises a first language locale and language locale of the setting of the GUI of the computer display comprises a second language locale; and
  sending, by the processor, a command to the GUI to display the object using a text string from the set of text strings associated with the second language locale as part of the instance.

8. The computer system of claim 7, the method further comprising:
simultaneously displaying, by the processor, the instance of the application in the GUI of a second computer display using a text string from the set of text strings associated with the first language locale, wherein the GUI of the second computer display is set to use the first language locale.

9. The computer system of claim 8, wherein the second computer display is a primary display in a computer system, on which the processor can control the application, and the first computer display is a secondary display, on which the application is displayed only.

10. The computer system of claim 7, wherein the set of text strings is used by the application to display text objects using the first language locale.

11. The computer system of claim 10, wherein the reference comprises an identifier for a file comprising the set of text strings and an identifier for the text object.

12. The computer system of claim 7, the method further comprising:
compiling, by the processor, source code for the application, the compiling comprising:
  identifying, by the processor, a text object in the source code;
  inserting, by the processor, code into object code for the text object, the inserted code providing a reference to the set of text strings associated with the text object.

13. A computer program product for displaying an application in a GUI of a computer display comprising:

a computer readable storage medium readable by one or more processor and storing instructions for execution by the one or more processor for performing a method comprising:
   determining, by a processor, a language locale setting of the GUI of the computer display, based on continuously monitoring, via a listener, one or more display threads of one or more secondary GUIs displayed on GUI of the computer display;
   intercepting, at runtime of an instance of an application, by the processor, a command from the instance of the application to display a text object in the GUI as part of the instance, wherein the text object incorporates a text string corresponding to the language locale in which the instance of the application has been instructed to display the text objects, wherein the intercepting comprises:
      determining, by the processor, based on the text string, a language locale in which the instance of the application has been instructed to display text objects; and
      determining, by the processor, if the language locale in which the instance of the application has been instructed to the display text objects is equivalent to the language locale of the setting of the GUI of the computer display;
   based on determining that the language locale in which the instance of the application has been instructed to the display text objects is not equivalent to the language locale of the setting of the GUI of the computer display, retrieving, by the processor, from the text object, a reference to a set of text strings associated with the text object, wherein each text string in the set of text strings has an associated language locale, wherein the language locale in which the instance of the application has been instructed to the display text objects comprises a first language locale and language locale of the setting of the GUI of the computer display comprises a second language locale; and
   sending, by the processor, a command to the GUI to display the object using a text string from the set of text strings associated with the second language locale as part of the instance.

14. The computer program product of claim 13, the method further comprising:
   simultaneously displaying, by the processor, the instance of the application in the GUI of a second computer display using a text string from the set of text strings associated with the first language locale, wherein the GUI of the second computer display is set to use the first language locale.

15. The computer program product of claim 14, wherein the second computer display is a primary display in a computer system, on which the processor can control the application, and the first computer display is a secondary display, on which the application is displayed only.

16. The computer program product of claim 13, wherein the set of text strings is used by the application to display text objects using the first language locale.

17. The computer program product of claim 16, wherein the reference comprises an identifier for a file comprising the set of text strings and an identifier for the text object.

18. The computer program product of claim 13, further comprising:
   compiling, by the processor, source code for the application, the compiling comprising:
      identifying, by the processor, a text object in the source code;
      inserting, by the processor, code into object code for the text object, the inserted code providing a reference to the set of text strings associated with the text object.

* * * * *